United States Patent [19]

Mesco

[11] 4,268,123
[45] May 19, 1981

[54] KINEMATIC MOUNT

[75] Inventor: Bernard Mesco, Playa Del Rey, Ca.

[73] Assignee: Hughes Aircraft Company, Culver City, Calif.

[21] Appl. No.: 15,271

[22] Filed: Feb. 26, 1979

[51] Int. Cl.³ .......................... G02B 7/02; G02B 7/18
[52] U.S. Cl. ................................... 350/310; 248/181; 248/DIG. 1; 350/253
[58] Field of Search ............... 350/252, 253, 288, 310; 248/179, 181, 466, 481–483, DIG. 1

[56] References Cited

U.S. PATENT DOCUMENTS

| 2,937,571 | 5/1960 | Thompson | 350/247 |
| 3,063,343 | 11/1962 | Kaestner | 350/310 |
| 3,189,775 | 6/1965 | Fyler | 248/181 X |
| 3,205,774 | 9/1965 | Estes | 350/226 |
| 3,474,998 | 10/1969 | Talbot | 248/483 |
| 3,493,291 | 2/1970 | Webb | 350/253 X |
| 3,510,219 | 5/1970 | Liva | 355/55 |
| 3,588,025 | 6/1971 | Gersman | 350/288 |
| 3,588,232 | 6/1971 | Mostel | 350/310 X |
| 3,601,343 | 8/1971 | Sivaslian | 350/252 X |
| 3,689,134 | 9/1972 | Leitmeir et al. | 350/252 |
| 3,751,139 | 8/1973 | Malherbe | 350/252 |
| 3,832,040 | 8/1974 | Ciabrini | 350/310 |

FOREIGN PATENT DOCUMENTS

| 247873 | 7/1912 | Fed. Rep. of Germany | 350/253 |
| 502353 | 3/1976 | U.S.S.R. | 350/310 |

Primary Examiner—F. L. Evans
Attorney, Agent, or Firm—Lewis B. Sternfels; W. H. MacAllister

[57] ABSTRACT

An optical element (10) is mounted and aligned with minimum strain and distortion within a housing (12) to which at least three mounts (14) are attached and spaced about 120° apart the periphery of the optical element. Each mount comprises a spherical disc (16) housed within an annular ring or sleeve (18), and each disc abuts and supports the optical element. Any loading exerted on the housing causes the discs to slide and/or rotate with respect to the annular disc-retaining sleeves to prevent such loadings from being transmitted to the optical element, thereby enabling the optical element to maintain a chosen, strain-free orientation.

10 Claims, 9 Drawing Figures

U.S. Patent  May 19, 1981  Sheet 1 of 3  4,268,123
Fig. 1.
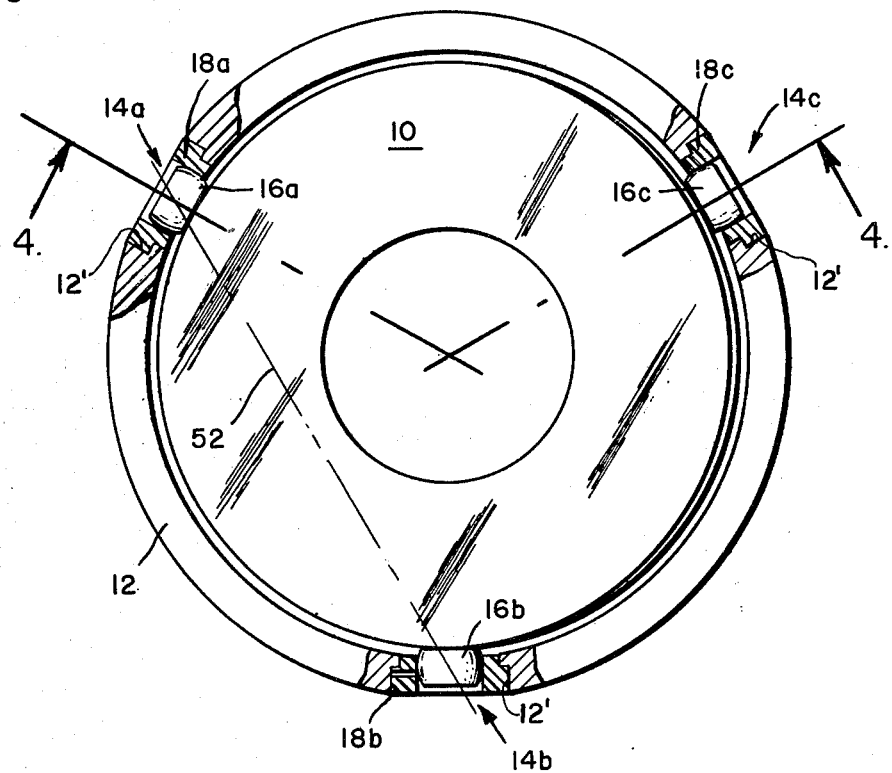
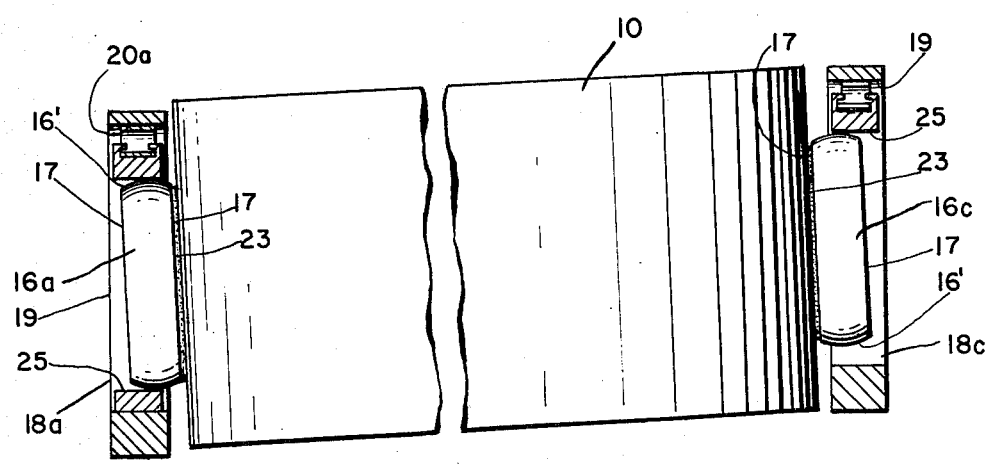
Fig. 4.

KINEMATIC MOUNT

The Government of The United States of America has right in this invention pursuant to Contract No. F29601-77-C-0027 awarded by The Department of The United States Air Force.

BACKGROUND OF THE INVENTION

1. Field of the Invention

This invention relates generally to housings and supports for optical elements and the like and, more particularly, to an improved kinematic mounting and housing arrangement for optical components having improved stress and strain compensation characteristics.

2. Description of the Prior Art

In many optical applications it is desirable to prevent any movement of certain optical elements when exposed to thermal expansion of member or members which support the optical elements. For example, a lens, mirror, or prism mounted in a close fitting metal cell could be constructed and designed to maintain perfect relative alignment with the cell in the absence of ambient temperature variations. However, under certain varying operating conditions, such as a decrease in temperature, the metal cell, because its coefficient of thermal expansion is normally higher than that of glass, will contract more rapidly than the glass, and may cause the glass to fracture or at least be stressed to the point of distorting the optical image which is transmitted through the glass or reflected therefrom. Conversely, as the temperature increases, the cell will expand more rapidly than the glass, leaving the lens unrestrained and free to move laterally within the cell, causing the optical element to become out-of-focus.

Various means and methods have been used and proposed in an attempt to avoid damage to an optical element, such as a lens or prism or IR sensor, while still restraining the element sufficiently to prevent excessive lateral displacement of the optical element within its cell. Such displacement ordinarily results when the combined lens and mount are subjected to wide temperature variations. A common method for mounting an optical element in a metal cell is to encircle the element with a thin endless metallic strip which is pressed into place around the element and which is attached to the cell. However, in applications where wide temperature variations are encountered, this method is objectionable because an excessive radial load must be applied by the strip to the element in order to retain the holding power of the strip. Also, extraordinary dimensional accuracy of the metallic ring and optical element is necessary in order to properly fit the ring into the optical element and, in practice, it is usually necessary to grind the element to fit the encircling ring in order to obtain the proper fit. This is costly and time consuming.

Another commonly used mounting method for fixedly supporting optical elements involves the use of spring loaded members equally spaced around the periphery of the element and positioned between the element and its supporting cell. A disadvantage of this method is the difficulty of positively aligning the element in the cell. Another disadvantage of this latter method is that the spring constants of the loading springs are or become not equal, especially after being subjected to a series of wide temperature variations. This generally results in relative misalignment of the elements after extended use of the instrument in which the optical elements are mounted.

One of the most common methods of fixedly mounting optical elements is the interposition of some resilient material between a lens and its retaining cell for the purpose of absorbing lateral shock, and compensating for the effects of temperature variation and attendant thermal expansion of the lens and cell. The resilient material usually takes the form of a gasket or a series of equally spaced shims for effectively centering the element. One major objection to this method is that the interposed material is subject to deterioration and loss of resiliency after the passage of time or after the optical system for the above hardware has been subjected to a series of wide temperature variations. Such deterioration of the interposed material may result in loss of relative alignment of the optical axis of the various optical elements in the system.

A method which has been used to overcome some of the disadvantages of the last-described method involves the use of tangent straps which are placed around the optical element. These straps provide relatively low elastic joints which are useful to minimize thermal expansion strains while allowing the optical element to remain fixed. The major objection to this method is that the thermal expansion strains are not entirely relieved due to the low elasticity of the tangent straps, causing the transmission through the optical element to become distorted. Additionally, the straps do not compensate for loading that causes the optical element to move out-of-plane.

SUMMARY OF THE INVENTION

The general purpose of this invention is to provide a novel kinematic mounting arrangement for optical elements or the like which maintains the optical element in a relatively strain-free condition under a wide variety of temperature and mechanical induced motions, and thereby overcomes the above described disadvantages of the prior art, while retaining all of the significant advantages of these prior art mounting arrangements.

To accomplish this purpose, a component, such as an optical element, is mounted and aligned, relative to its housing by an arrangement of preferably three mounts. Each mount includes an inner disc member, having flat major surfaces lying in parallel planes, and a spherically contoured minor outer surface, which is mounted in a cylindrical retaining sleeve having three or more contact surfaces located in the opening of the sleeve. When the major surfaces of the three disc members are placed in intimate contact with the optical element at selectively spaced locations thereon, the resultant forces, exerted by the housing and the optical element on the three disc members, tend to stabilize the disc members, and thereby create equilibrium in the mounting and aligning device. However, it is required that the three mounts be positioned such that they define a plane through the component.

The three mount arrangement, therefore, provides rotational and linear freedom of motion, so that, when temperature variations occur, the inner disc member of each mount may move both linearly and angularly relative to the surrounding retaining sleeve in which it is mounted, to absorb those motions which would otherwise stress and misalign the optical element and to maintain the orientation of the optical element substantially fixed. Further, stress and misalignment is avoided by contructing each mount, which includes the retaining sleeve and inner disc member, of the same material to eliminate differential thermal expansion.

Accordingly, it is a primary object of the present invention to provide a novel mounting for optical elements and the like.

It is a further object of the present invention to provide a strain free, sufficiently rigid mounting for such optical elements to maintain them in optical alignment over wide temperature ranges.

A further object of the present invention is both to simplify the adjustment, centering and retention of such optical elements, and to compensate for any dimensional inaccuracies in their mounting.

These and other objects, features and advantages will become more apparent after considering the following detailed description in connection with the accompanying drawings wherein like reference characters refer to like parts.

BRIEF DESCRIPTION OF THE DRAWINGS

FIG. 1 is a side view of an optical element mounted in a support utilizing three mounting and aligning devices of the present invention;

FIG. 4 is a side view of two of the mounts on the optical element taken along lines 4—4 of FIG. 1, illustrating the alignment principle of the present invention;

DETAILED DESCRIPTION OF THE PREFERRED EMBODIMENT

Referring first to FIG. 1, an optical element 10 is mounted on to a housing 12 by three mounting and aligning devices 14, hereinafter referred to as "mounts". The mounts 14 are positioned around the periphery of element 10 and define a plane through element 10. While three mounts are shown, it is to be understood that any number of mounts can be used so long as all define a single plane passing through the optical element. In a typical system, housing 12 comprises a beam expander and the optical element 10 comprises a mirror.

Figure 2:
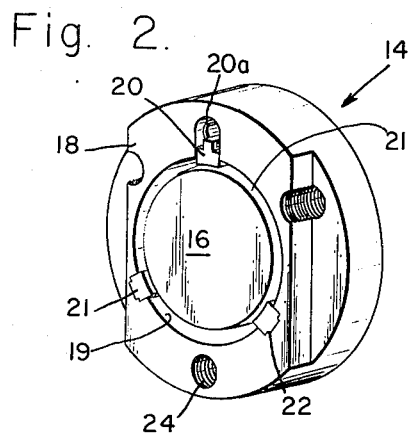
FIG. 2 is a perspective view of one of the mounting and aligning devices shown in FIG. 1.
Figure 3:
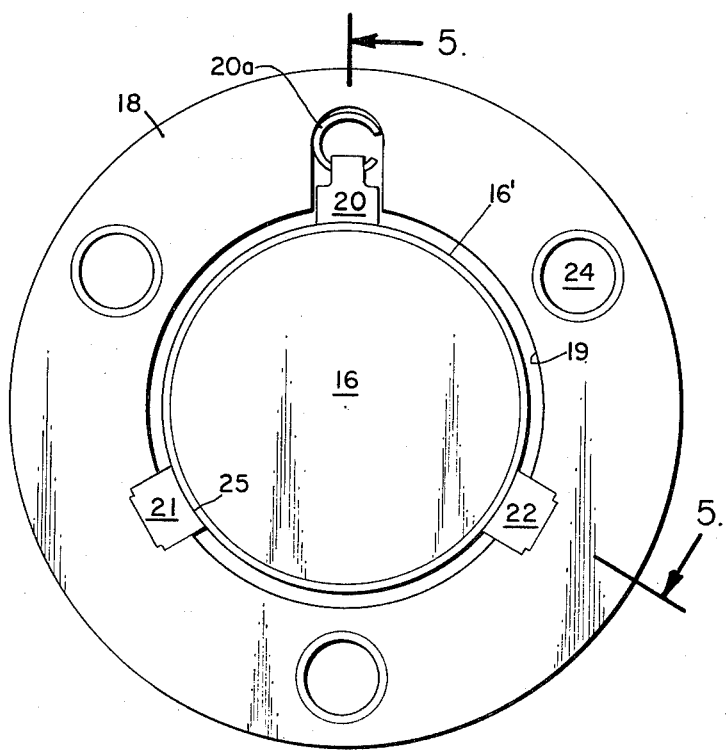
FIG. 3 is a plan view of one of the mounts.
Figure 5:
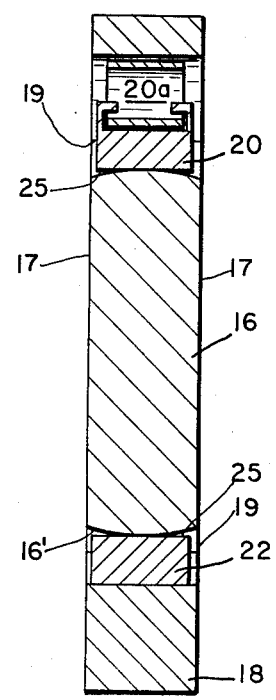
FIG. 5 is a cross-sectional view of one of the mounts taken along lines 5—5 of FIG. 3.

Referring also to FIGS. 2, 3 and 5, each mount 14 includes an inner disc member 16 retained in a cylindrical retaining sleeve 18. The cylindrical retaining sleeve has a major opening therein defined by three or more curvilinear surfaces, specifically configured herein as an annular ring having an inner cylindrically shaped wall 19. Each ring or sleeve 18 includes threaded holes 24 by which it is fastened by screws or bolts to the housing 12 (see FIG. 1). However, in lieu of holes, any bonding agent, such as epoxy, or other mounting means, such as clamps, may be used. For purposes of centering element 10 and adjusting its tilt with respect to the housing, holes 12' in housing 12 are oversized with respect to rings 18, as will be described in somewhat greater detail below.

As best shown in FIGS. 4 and 5, the disc 16 has two flat major surfaces 17 lying in parallel planes, and a curved outer surface 16' contoured herein as a sphere. The disc is affixed to the optical element 10 by means of an epoxy 23 or, if desired, by screws or bolts. The disc is then placed in close proximity with the inner wall of ring 18. It is desirable, in some very accurate optical installations, that the gap between the spherical surface 16' of the disc 16 and the inner wall 19 of the ring 18 not exceed ±0.00001 inch tolerance, to avoid undue misalignment in the optical element relative to the support. It is understood, of course, that such tolerances may be relaxed where high accuracy of the optical installation is reduced. Therefore, for such precise tolerances, three pads 20, 21 and 22 may be mounted within the inner wall of the ring 18, with surface 25 protruding therefrom for directly contacting the spherically contoured surface of disc 16. To overcome any other type of misalignment and to compensate for machining tolerances between the disc and the annular ring, one pad, such as pad 20, is preloaded by use of a spring 20a, shown as a split cylinder because it exerts a high force in a small volume. The spring 20a also compensates for any differential thermal expansion and contraction between the disc 16 and the ring 18 when the system 18 is subjected to variable temperatures. For example, when the disc expands or contracts with respect to the ring, the spring will contract or expand accordingly, thus allowing the disc to remain in contact with the ring and the element to remain fixed relative to the housing.

To enable centering and tilt adjustment of element 10, prior to its being fastened to the housing, one of the oversized mounting holes 12' in the housing, permit one of the rings 18, e.g., ring 18c, to move laterally with respect to its hole 12' while the remaining rings 18a and 18b of each of the mounts. The ring 18 of the mounts 14a and 14b are fixed to the housing, so that the ring 18c is pivoted around an axis 52 passing through the disc, 16a and 16b. During lateral, movement of ring 18c in its hole 12', discs 16a, 16b, and 16c also are capable of sliding within their rings. Once the desired position of element 10 is attained, the ring 18c is locked in place. It has been found that the above-identified locking action induces very minimal strain on the optical element 10 as compared to the prior art.

After such centering and tilt adjustment, if the position of one of the mounts is changed due to environmental loading which would tend to misalign the element 10, the mounts can pivot about and/or slide about the axis through their discs 16 so as to maintain the mounts in the same plane. For example, as shown in FIG. 4, the discs 16a and 16c have moved to compensate for the out-of-plane motion of the optical element, caused by environmental loading and the third disc 16c (see FIG. 1) will pivot correspondingly.

Figure 6B:
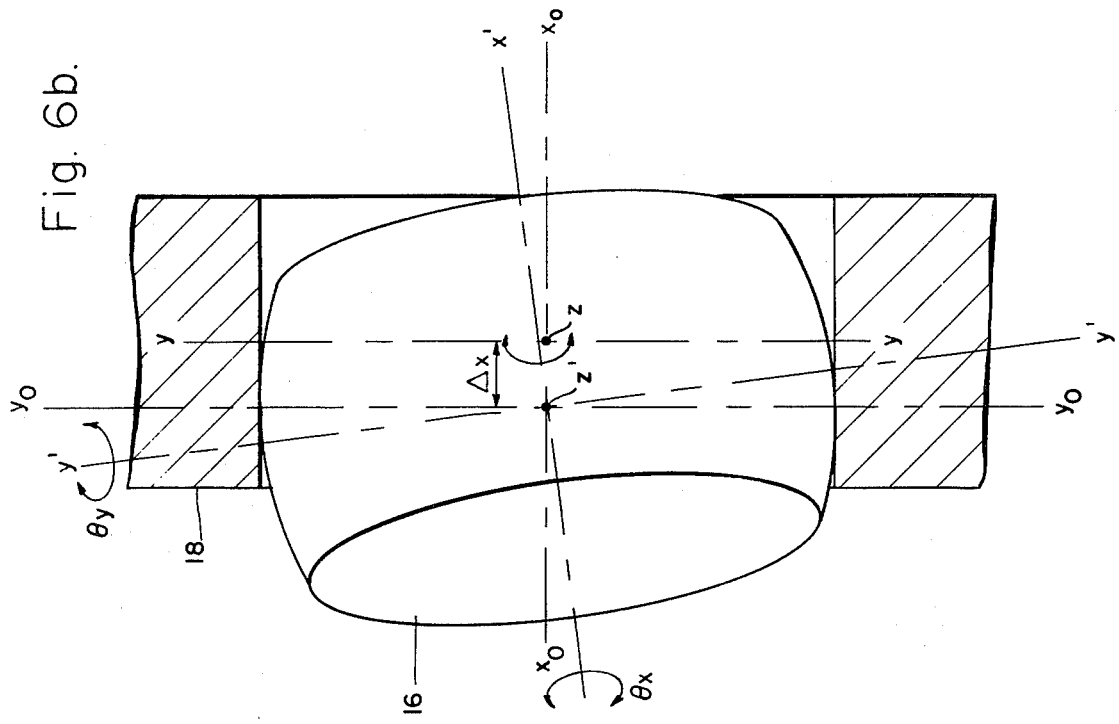
FIGS. 6a and 6b are cross-sectional views of one of the mounts illustrating its freedom of motion.
Figure 6A:
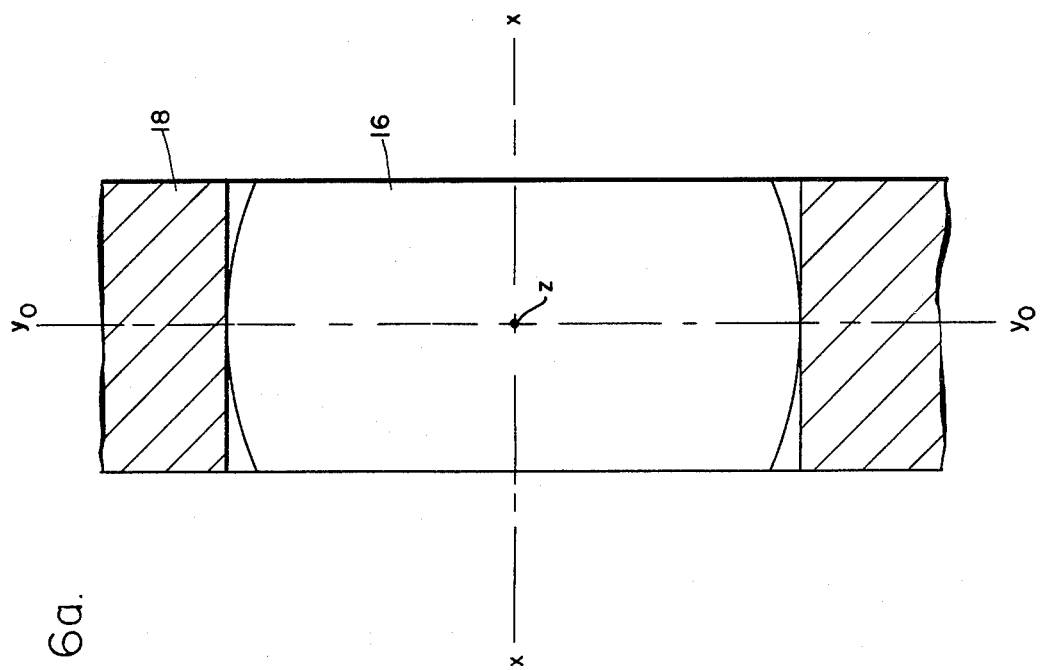

As a further illustration, after the optical element 10 is centered and tilt aligned, the disc 16 is initially positioned with respect to the ring 18 as exemplified in FIG. 6a. However, in response to stresses or changes in temperature in the structure caused by environmental loading, the disc 16 will either rotate and/or move radially. Such motions are illustrated by the repositioning of the disc in FIG. 6b. Since the disc 16 is bounded by the ring 18, the disc is restricted to linear motion along the $x_o$ axis and may not linearly move along the $y_o$ and $z_o$ axes. The disc may, however, rotate, as shown, about each axis by an amount $\theta_x, \theta_y$, and $\theta_Z$ to a new position as defined by axes x', y', and z' respectively, and the center of the disc 16 will move along the $x_o$ axis an amount $\Delta x$. Thus, the disc 16 has radial and rotational freedom of motion and can compensate for environmental loading so as not to impart strains to the optical element.

The device of the present invention was tested in a laboratory set-up using a simulated primary mirror as the optical element, and a back-plate structure as the housing. The primary mirror had spring loaded mounts installed thereon. The slippage between the primary mirror and the back-plate structure due to thermal loading, friction, mirror tilt in the center, and shock response was measured.

After several experiments were conducted, it was found that the optical element had not moved relative to its housing when it was placed under environmental loading.

Figure 8:
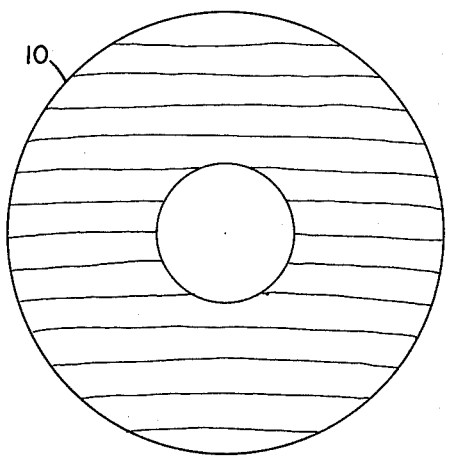
FIG. 8 is a diagrammatic interpretation of an interferometric pattern on an identical optical component as that of FIG. 7 but using the mounting devices of the present invention.
Figure 7:
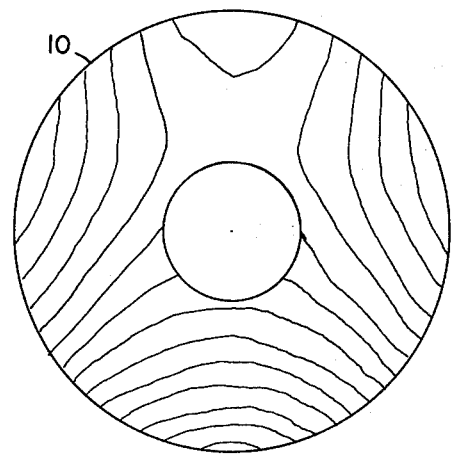
FIG. 7 is a diagrammatic interpretation of an interferometric pattern on an optical element using one of the prior art mounting devices.

FIGS. 7 and 8 illustrate the optical improvement obtained through use of the present invention over an existing mounting and aligning device, utilizing a diagrammatic interpretation of the primary distortion of an interferometric pattern on an optical element. The present invention was tested under boundary conditions including a temperature range of $\pm 30°$ F. $\Delta t$. The results using the present invention are shown in FIG. 8. A prior art mount, comprising a point tangent strap mount, was tested under the same temperature loading conditions and produced the distortions depicted in FIG. 7. It is evident that the distortions due to the mount of the present invention are very minimal in comparison with those resulting from the prior art mount. Such differences in distortion dramatize an important result of the present invention in that a mounting device should not transmit any strain on an optical element.

The mount design of the present invention produces, in effect, a true kinematic mount in which a movement of the beam expander in any direction will produce practically no strain, but only minimal friction from the preload in the ring of the mount while it is fixed to the housing.

Although the invention has been described with reference to a particular embodiment thereof, it should be realized that various changes and modifications may be made therein without departing from the spirit and scope of the invention.

What is claimed is:

1. Apparatus including a mounting and aligning device comprising:
   an element lying generally in a plane;
   a support surrounding said element;
   a plurality of retaining sleeves positioned in said support and about said element; and
   a plurality of disc members positioned in the plane of and engageably supporting said element and respectively mounted within said sleeves, each said disc member having a center and a spherically curved outer surface in both sliding linear and rotatable engagement with said sleeve, respectively along a longitudinal axis of said sleeve passing through the disc member center and about three orthogonal axes passing through the disc member center.

2. The device of claim 1 further comprising separate and spaced upstanding pads extending inwardly respectively of each of said sleeves into supporting contact with each of said disc members, and a spring engaging at least one of said pads to compensate for any machining tolerance between said outer surface respectively of said disc members and said sleeves.

3. An apparatus for maintaining an optical element in a substantially fixed orientation and substantially immune to environmentally-induced stresses and strains in members adjacent thereto, comprising, in combination:
   (a) an outer support housing having a plurality of selectively spaced openings therein,
   (b) a plurality of retaining sleeves, each mounted in said openings respectively, each sleeve having a cylindrical axial inner surface therethrough,
   (c) a plurality of cylindrical disc members slidably coaxially mounted respectively within each of said sleeves; and each disc member having parallel inner and outer major opposing surfaces and a minor outer surface having a spherical contour which frictionally engages said cylindrical inner surfaces of said sleeves, respectively, and are frictionally movable linearly along a longitudinal axis of each sleeve and further are frictionally and angularly rotatable about three major axes through each disc member, and
   (d) an optical element mounted within said support housing, and engaging each disc member at the inner major surface thereof, whereby angular and linear stresses and strains imparted between said optical element and said support housing are absorbed by said disc members and are translated into angular and linear motion of said disc members to thereby enable the orientation of said optical element within said housing to remain fixed.

4. The apparatus defined in claim 3 wherein said disc members are each received by separate and spaced upstanding pads within each of said sleeve surfaces, with at least one of said pads being spring loaded, whereby the machining tolerances between said minor outer surfaces of said disc members and said sleeve surfaces are minimized.

5. The apparatus defined in claim 4 wherein said sleeve and disc members are mounted at 120° spacing in said openings of said outer support housing, and said disc members each engage said optical element on an outer cylindrical surface thereof, whereby the orientation of said optical element may be determined by movement of one or more of said disc members.

6. A device for mounting an element to a housing with a minimum of strain and distortion exerted on the element, comprising:
   mounts positioned around the periphery of the element and respectively including a cylindrical retaining sleeve coupled to the housing and an inner disc member coupled to the element, said disc members each having a center lying in a common plane passing through the element and a spherically contoured outer surface focused at the center, and each said retaining sleeve having an inner cylindrical surface whose axis passes through the disc member center and which is in intimate contact with said disc member surface to provide linear movement and three-dimensional rotation of each of said disc members with respect to said sleeves.

7. The device of claim 6 further including contacting means for intercoupling said cylindrical retaining sleeve to said inner disc member at the contact surfaces.

8. The device of claim 7 wherein said contacting means includes a preloaded spring exerting a spring force against said inner disc member.

9. The device of claim 6 further including a support having openings therein which are oversized with respect to said retaining sleeves for respective reception therein and for initial centering and tilt adjustment of the element, and means affixing said sleeves to said support after the initial centering and tilt adjustment.

10. The device of claim 7 wherein said mounts are equally spaced around the periphery of the element.

* * * * *